(12) United States Patent
Choi et al.

(10) Patent No.: US 11,492,423 B2
(45) Date of Patent: Nov. 8, 2022

(54) METHOD FOR PREDICTING PHYSICAL PROPERTIES OF POLYETHYLENE RESIN, AND PRODUCTION METHOD OF POLYETHYLENE RESIN

(71) Applicant: LG Chem, Ltd., Seoul (KR)

(72) Inventors: Seung Won Choi, Daejeon (KR); Eun Jung Joo, Daejeon (KR)

(73) Assignee: LG Chem, Ltd.

( * ) Notice: Subject to any disclaimer, the term of this patent is extended or adjusted under 35 U.S.C. 154(b) by 73 days.

(21) Appl. No.: 17/059,897

(22) PCT Filed: Aug. 23, 2019

(86) PCT No.: PCT/KR2019/010791
§ 371 (c)(1),
(2) Date: Nov. 30, 2020

(87) PCT Pub. No.: WO2020/096182
PCT Pub. Date: May 14, 2020

(65) Prior Publication Data
US 2021/0206887 A1    Jul. 8, 2021

(30) Foreign Application Priority Data

Nov. 5, 2018 (KR) .................. 10-2018-0134670

(51) Int. Cl.
| | | |
|---|---|---|
| C08F 2/44 | (2006.01) | |
| C08F 2/38 | (2006.01) | |
| C08F 6/26 | (2006.01) | |
| C08F 10/02 | (2006.01) | |
| C08J 3/24 | (2006.01) | |

(52) U.S. Cl.
CPC .................. *C08F 2/44* (2013.01); *C08F 2/38* (2013.01); *C08F 6/26* (2013.01); *C08F 10/02* (2013.01); *C08J 3/24* (2013.01); *C08J 2323/06* (2013.01)

(58) Field of Classification Search
USPC ...................................... 525/51, 53; 700/269
See application file for complete search history.

(56) References Cited

U.S. PATENT DOCUMENTS

| | | |
|---|---|---|
| 6,677,408 B1 | 1/2004 | Mahling et al. |
| 2004/0038301 A1 | 2/2004 | Lee et al. |
| 2015/0239997 A1 | 8/2015 | Defrancisci et al. |
| 2015/0299494 A1 | 10/2015 | Sun et al. |
| 2016/0289378 A1 | 10/2016 | Chellamuthu et al. |
| 2018/0011024 A1 | 1/2018 | Reed et al. |
| 2018/0265611 A1 | 9/2018 | Berbee et al. |
| 2018/0328149 A1 | 11/2018 | Lee et al. |
| 2019/0154588 A1 | 5/2019 | Reed et al. |

FOREIGN PATENT DOCUMENTS

| | | |
|---|---|---|
| CN | 106986956 A | 7/2017 |
| JP | H01101462 A | 4/1989 |
| JP | H07300532 A | 11/1995 |
| JP | 2003502457 A | 1/2003 |
| JP | 2003076934 A | 3/2003 |
| JP | 2016503101 A | 2/2016 |
| KR | 20020016086 A | 3/2002 |
| KR | 20110020126 A | 3/2011 |
| KR | 20150058307 A | 5/2015 |
| KR | 20150103673 A | 9/2015 |
| KR | 20170108048 A | 9/2017 |
| KR | 20180061233 A | 6/2018 |

OTHER PUBLICATIONS

Extended European Search Report including Written Opinion for Application No. 19882345.2 dated Aug. 6, 2021, 5 pages.
Mariano Asteasuain, et al., "Peroxide modification of polyethylene. Prediction of molecular weight distributions by probability generating functions", Polymer, Apr. 2002, pp. 2363-2373, vol. 43, No. 8, Elsevier Science Publishers, B.V., GB.
International Search Report for PCT/KR2019/010791 dated Dec. 5, 2019; 4 pages.

*Primary Examiner* — Fred M Teskin
(74) *Attorney, Agent, or Firm* — Lerner, David, Littenberg, Krumholz & Mentlik, LLP

(57) ABSTRACT

A method for predicting physical properties of a polyethylene resin is provided, which can reliably predict a proper charging ratio of a crosslinking agent in the production process of a low density crosslinked polyethylene resin, and the physical properties of the polyethylene resin achieved therefrom. A method for producing a polyethylene resin by applying the same method is also provided.

14 Claims, No Drawings

METHOD FOR PREDICTING PHYSICAL PROPERTIES OF POLYETHYLENE RESIN, AND PRODUCTION METHOD OF POLYETHYLENE RESIN

CROSS-REFERENCE TO RELATED APPLICATION(S)

The present application is a national stage entry under 35 U.S.C. § 371 of International Application No. PCT/KR2019/010791 filed on Aug. 23, 2019, which claims priority to Korean Patent Application No. 10-2018-0134670 filed with the Korean Intellectual Property Office on Nov. 5, 2018, the disclosures of which are incorporated herein by reference in their entirety.

TECHNICAL FIELD

The present disclosure relates to a method for predicting physical properties of a polyethylene resin which can reliably predict a proper charging ratio of a crosslinking agent in the production process of a low-density crosslinked polyethylene resin, and the physical properties of the polyethylene resin achieved therefrom, and a method for producing a polyethylene resin by applying the same.

BACKGROUND

The low-density crosslinked polyethylene resin used for the manufacturing of electric wires can generally be produced by subjecting an ethylene monomer to a high pressure polymerization at a temperature of at least 150° C. under a pressure of at least 2200 bar to obtain a low-density polyethylene resin, and then crosslinking the low-density polyethylene resin in the presence of a peroxide-based crosslinking agent such as dicumyl peroxide.

In such a low-density crosslinked polyethylene resin, not only the basic physical properties of the low-density polyethylene resin before crosslinking but also its physical properties may be affected in accordance with the degree of crosslinking. Thus, the charging amount of the crosslinking agent or the ratio at which the low-density polyethylene resin absorbs the crosslinking agent may significantly affect the physical properties of the final low-density crosslinked polyethylene resin. Consequently, in the production process of the low-density crosslinked polyethylene resin, the charging amount of the crosslinking agent and the degree of absorption thereof have been recognized as one of the important process factors.

In this regard, previously, in accordance with the target physical properties of the final low-density crosslinked polyethylene resin or the wire coating manufactured therefrom, the charging amount of the crosslinking agent was adjusted and added, and after the production of the final resin, a method of confirming the physical properties was applied.

However, previously, even if the charging amount of the crosslinking agent was adjusted based on these methods, the crosslinking agent absorption ratio of the low-density polyethylene resin often shows a big deviation depending on the physical properties of the polyethylene resin itself before crosslinking, and the change and/or adjustment of other process factors. As a result, even if the charging amount of the crosslinking agent is adjusted, it often showed deviation from the target physical properties of the final low-density crosslinked polyethylene resin, and in many cases, it was difficult to accurately predict whether or not the target physical properties of the final resin could be achieved in accordance with the amount of the crosslinking agent. Accordingly, there has been a continuous demand for a physical property prediction method capable of accurately predicting the absorption ratio of the crosslinking agent, etc., in accordance with the charging amount of the crosslinking agent and reliably predict the physical properties of the final low-density crosslinked polyethylene resin, and there is a need to develop a method capable of adjusting the charging amount of the crosslinking agent in accordance with the target physical properties by applying this method.

Technical Problem

The present disclosure provides a method for predicting physical properties of a polyethylene resin which can reliably predict the crosslinking agent absorption ratio from the crosslinking agent charging ratio in the production process of a low-density crosslinked polyethylene resin, and the physical properties of the polyethylene resin achieved therefrom.

Further, the present disclosure provides a method for producing a polyethylene resin that can adjust the charging ratio of the crosslinking agent and the process conditions by applying the above-described physical property prediction method, thereby easily achieving the target physical properties of the low-density crosslinked polyethylene resin.

Technical Solution

In one aspect of the present disclosure, there is provided a method for predicting physical properties of a polyethylene resin including: polymerizing ethylene in a first reactor to form a low-density polyethylene resin, and crosslinking the low density polyethylene resin in a second reactor in the presence of a peroxide-based crosslinking agent, wherein the method comprises:

measuring a ratio Y2 (wt %) at which the low-density polyethylene resin absorbs the crosslinking agent based on a peak temperature T of the first reactor and a charging ratio Y1 (wt %) of the peroxide-based crosslinking agent in the second reactor;

determining constants of A and B by performing a linear regression according to the following Equation 1 on the basis of the measured and the collected data; and predicting a ratio Y2 (wt %) at which the low-density polyethylene resin absorbs the crosslinking agent in the production process of the low-density crosslinked polyethylene resin in accordance with the linear regression equation of Equation 1 in which the constants of A and B have been determined.

$$(Y1-Y2)=A+BT \qquad \text{[Equation 1]}$$

in Equation 1, Y1 (wt %) is the charging ratio (wt %) of (peroxide-based crosslinking agent charged to the second reactor/low-density polyethylene resin charged to the second reactor), Y2 (wt %) is the crosslinking agent absorption ratio (wt %) of (peroxide-based crosslinking agent absorbed into the low-density polyethylene resin in the second reactor/low-density polyethylene resin charged to the second reactor), T is the polymerization peak temperature (° C.) of the first reactor, and A and B are constants determined by linear regression analysis.

In another aspect of the present disclosure, there is provided a method for producing a polyethylene resin including:

determining target physical properties of a final produced low-density crosslinked polyethylene resin;

determining a target absorption ratio of a crosslinking agent of the low-density polyethylene resin to obtain the target physical properties; and determining the production process conditions of the low-density crosslinked polyethylene resin through the physical property prediction method on the basis of the target absorption ratio of the crosslinking agent, to produce a low-density crosslinked polyethylene resin.

Hereinafter, the physical property prediction method and the production method of the polyethylene resin according to specific embodiments of the present disclosure will be described in detail.

According to one embodiment of the present disclosure, there is provided a method for predicting physical properties of a polyethylene resin including: polymerizing ethylene in a first reactor to form a low-density polyethylene resin, and crosslinking the low density polyethylene resin in a second reactor in the presence of a peroxide-based crosslinking agent, wherein the method comprises:

measuring a ratio Y2 (wt %) at which the low-density polyethylene resin absorbs the crosslinking agent based on a peak temperature T of the first reactor and a charging ratio Y1 (wt %) of the peroxide-based crosslinking agent in the second reactor;

determining constants of A and B by performing a linear regression according to the following Equation 1 on the basis of the measured and the collected data; and predicting a ratio Y2 (wt %) at which the low-density polyethylene resin absorbs the crosslinking agent in the production process of the low-density crosslinked polyethylene resin in accordance with the linear regression equation of Equation 1 in which the constants of A and B have been determined.

[Equation 1]

$$(Y1-Y2)=A+BT$$

in Equation 1, Y1 (wt %) is the charging ratio (wt %) of (peroxide-based crosslinking agent charged to the second reactor/low-density polyethylene resin charged to the second reactor), Y2 (wt %) is the crosslinking agent absorption ratio (wt %) of (peroxide-based crosslinking agent absorbed into the low-density polyethylene resin in the second reactor/low-density polyethylene resin charged to the second reactor), T is the polymerization peak temperature (° C.) of the first reactor, and A and B are constants determined by linear regression analysis.

A low-density crosslinked polyethylene resins for use in the manufacturing of electric wires, etc. can be generally produced by polymerizing ethylene in a first reactor to form a low-density polyethylene resin, and crosslinking the low-density polyethylene resin in the presence of a peroxide-based crosslinking agent in a second reactor connected to the first reactor.

The present inventors have accumulated a lot of process data and continued the research on what proportion the low-density polyethylene resin absorbs the crosslinking agent in accordance with the crosslinking agent charging ratio to the second reactor, by controlling the various process factors while performing the processes of producing such a low-density crosslinked polyethylene resin for many years.

As a result of the continuing research, the inventors have found that the deviation between the crosslinking agent charging ratio Y1 (wt %) and the crosslinking agent absorption ratio Y2 (wt %) has a substantially proportional relationship with the peak temperature T of the first reactor in which the polymerization is performed, thereby completing the present disclosure. Its technical principle can be predicted as follows.

In general, when the polymerization temperature in the polymerization becomes higher, the thermal energy resulting therefrom can increase the breakage of the polymer main chain. Thereby, when the peak temperature T of the first reactor is increased, the low-density polyethylene resin formed in the polymerization contains relatively many polymer chains with shorter length, and thus, such a short-chain polymer appears that the degree of absorption and crosslinking of the crosslinking agent is not high. Therefore, when the peak temperature T becomes higher, even if the crosslinking agent charging ratio Y1 (wt %) is high, its absorption ratio (wt %) is lowered, so that the deviation of (Y1−Y2) may increase. As a result, such a deviation can show a substantially proportional relationship with the peak temperature T of the first reactor.

Based on these research results, in the method of one embodiment, first, while changing the reaction conditions including the T and Y1, the production process data of the low-density crosslinked polyethylene resin in the first and second reactors may be collected. In particular, under the conditions of each of these steps, the ratio Y2 at which the low-density polyethylene resin absorbs the crosslinking agent is measured, and raw data that is the basis for predicting the physical properties in the method of one embodiment can be collected. The absorption ratio Y2 of such crosslinking agent can be measured, for example, using an MDR (moving die rheometer, MDR200E). More specifically, the change in torque due to the progress of the crosslinking in the measurement sample is measured using this MD, the difference with the torque change of the reference sample which already knows the absorption ratio of the crosslinking agent is compared, and the crosslinking agent absorption ratio of the measurement sample can be converted/measured.

From these raw data, when the conditions of other processes are the same, it is possible to collect data on how the absorption ratio Y2 of the crosslinking agent changes according to the peak temperature T of the first reactor and the charging ratio Y1 of the crosslinking agent. These data may be linearly regressed in the form of a linear function of Equation 1 through a data regression model method well known to those skilled in the art. By determining the constants of A and B from the linear regression results, it is possible to determine the physical property prediction equation of Equation 1 for the prediction of the physical properties of the low-density crosslinked polyethylene resin.

After such physical property prediction equation is determined, the conditions for the subsequent low-density crosslinked polyethylene resin production process can be determined based on the equation. In other words, when substituting the above-described physical property prediction equation in consideration of the peak temperature T, etc. in the process that is actually applied, it is possible to determine the crosslinking agent charging ratio Y1 for obtaining the crosslinking agent absorption ratio Y2 that must be finally achieved. Thereby, in the actual process, the target absorption ratio Y2 of the crosslinking agent can be more easily predicted and achieved. As a result, the target physical properties of the low-density crosslinked polyethylene resin can be more reliably predicted and easily achieved in actual steps.

Actually, as demonstrated in the Examples described below, it was confirmed that the deviation value of (Y1−Y2)

predicted based on the physical property prediction equation of Equation 1, and the deviation value of (Y1−Y2) measured from the actual process data have almost no difference. Through this, it was confirmed that the crosslinking agent absorption ratio and physical properties of the polyethylene resin prepared in the method of one embodiment can be predicted very reliably.

On the other hand, the low-density crosslinked polyethylene resin having physical properties predicted by the method of the one embodiment can be prepared according to a well-known production method of a polyethylene resin for the manufacturing of electric wires.

First, the polymerization in the first reactor may be performed by radical polymerization, and the polymerization may be performed in a high-pressure radical polymerization at a temperature of 150 to 320° C., or 200 to 300° C. and a pressure of 2200 bar or more, or 2200 to 3000 bar. At this time, the peak temperature T of the first reactor can be adjusted within the range of 290 to 320° C., or 295 to 310° C.

In addition, this polymerization reaction can be performed in the presence of a reaction initiator containing oxygen and organic peroxide. Further, the polymerization may be performed in the presence of an olefinic molecular weight regulator having 3 or more carbon atoms or 3 to 5 carbon atoms, for example, propylene.

Through the polymerization reaction described above, a low-density polyethylene resin can be formed, and such low-density polyethylene resin may have a density of, for example, 0.900 to 0.945 g/cm³, or 0.915 to 0.935 g/cm³.

On the other hand, after performing the polymerization reaction in a first reactor, the low-density polyethylene resin formed by polymerization can be subjected to a crosslinking reaction with a peroxide-based crosslinking agent in a second reactor connected to the first reactor to obtain a final low-density crosslinked polyethylene resin.

In this crosslinking reaction, the peroxide-based crosslinking agent can use a peroxide such as dicumyl peroxide, which has been previously applied to prepare crosslinked polyethylene resins, without particular limitation.

Further, the crosslinking reaction may be performed at a temperature of 110 to 210° C., or 140 to 190° C., and the charging ratio Y1 (wt %) of the crosslinking agent can be adjusted within the range of 1.5 to 2.0 wt %, or 1.7 to 1.8 wt %.

That is, in the production process of the low-density crosslinked polyethylene resin which is performed under the above-mentioned conditions, the physical property prediction equation of Equation 1 is obtained by the method of one embodiment, and then the absorption ratio Y2 of the crosslinking agent in the crosslinking can be reliably predicted by applying the equation, from which it is possible to proceed with the process by determining the cross-linking agent charging ratio Y1. Thereby, the desired crosslinking agent absorption ratio Y2 and the target physical properties of the low-density crosslinked polyethylene resin achieved therefrom can be more easily and effectively achieved.

On the other hand, in the above-described method of one embodiment, it is divided into a plurality of sections in accordance with the charging ratio Rm of the olefin-based molecular weight regulator supplied to the first reactor (where Rm represents "the charging weight ratio of the olefinic molecular weight regulator charged to the first reactor/ethylene charged to the first reactor"), and the linear regression equation of Equation 1 may be separately determined according to the plurality of sections thus divided.

This is because, based on the research results of the present inventors, it was confirmed that the difference between the charging ratio Y1 (wt %) of the crosslinking agent and the absorption ratio Y2 (wt % t) of the crosslinking agent is considerably different depending on not only the peak temperature T of the first reactor described above but also the charging ratio Rm of the olefinic molecular weight regulator. Its technical principle can be predicted as follows.

In general, the crosslinking agent is one that generates a radical by removing hydrogen in a polymer, and initiates the crosslinking reaction. When the charging ratio of the olefinic molecular weight regulator is increased, the low-density polyethylene resin tends to have more short chain branching. However, the tendency to generate radicals from such short-chain branches is high, and therefore, if the charging ratio of an olefinic molecular weight regulator increases, the reaction degree of a crosslinking agent, i.e., the absorption ratio of a low-density polyethylene resin will become higher.

As a result, when the charging ratio of the olefinic molecular weight regulator increases, even if the charging ratio Y1 (wt %) of the crosslinking agent is relatively low, its absorption ratio (wt %) is increased and thus, the deviation of the (Y1−Y2) is increased. Therefore, such deviation can be relatively greatly affected by the ratio of the olefinic molecular weight regulator.

Therefore, if the physical property prediction equation of Equation 1 is separately set for each charging ratio section, the charging ratio of the crosslinking agent under the corresponding conditions, or the crosslinking agent absorption ratio according to process conditions such as peak temperature of the first reactor and the physical properties of the final low-density crosslinked polyethylene resin can be more reliably predicted.

In a more specific embodiment, it is divided into a first section where the charging ratio Rm of the olefin molecular weight regulator is less than 0.0148, a second section where the Rm is 0.0148 or more and less than 0.0150, and a third section where the Rm is 0.0150 or more, and Equation 1 is individually set. Thereby, it was confirmed that the absorption ratio of the crosslinking agent and the physical properties of the final low-density crosslinked polyethylene resin can be more reliably predicted.

In addition, in these three sections, it was confirmed that a linear regression equation of Equation 1 can be determined as (Y1−Y2)=A+0.0056T (with the proviso that values of A in each section differ from each other).

As described above, according to the method for predicting the physical properties according to one embodiment, in the production process of the low-density crosslinked polyethylene resin applied for the manufacturing of electric wires, etc., the charging ratio of the crosslinking agent, the absorption ratio of the crosslinking agent according to process conditions such as the peak temperature of the first reactor, and the physical properties of the final low-density crosslinked polyethylene resin can be predicted very reliably.

According to another embodiment of the present disclosure, there is provided a method for producing a polyethylene resin to which the above-described physical property prediction method is applied. The method for producing a polyethylene resin according to such other embodiment may include:

determining target physical properties of a final produced low-density crosslinked polyethylene resin;

determining a target absorption ratio of a crosslinking agent of the low-density polyethylene resin to obtain the target physical properties; and determining the production process conditions of the low-density crosslinked polyethylene resin through the physical property prediction method on the basis of the target absorption ratio of the crosslinking agent, to produce a low-density crosslinked polyethylene resin.

In such production method, in consideration of the target physical properties of the low-density crosslinked polyethylene resin and the target absorption ratio of a suitable crosslinking agent for achieving the same, appropriate process conditions, for example, the polymerization peak temperature of the first reactor, the charging ratio of the olefinic molecular weight regulator and the charging ratio of the crosslinking agent, etc. can be determined by substituting Equation 1 determined by the method of predicting the physical properties of the one embodiment.

This makes it possible to more easily and effectively obtain a low-density crosslinked polyethylene resin having desired target physical properties, and this can be preferably applied for the manufacturing of electric wire coating, and the like.

In the production method of another embodiment described above, since a general method for producing a low-density crosslinked polyethylene resin for the manufacturing of electric wires can follow except for determining the process conditions by the physical property prediction method of the above-described one embodiment, an additional description thereof will be omitted.

Advantageous Effects

As described above, according to the present disclosure, by controlling reaction conditions or the like in each reactor in the production method of the polyethylene resin applied for producing a polyethylene resin or the like for protective film of display and the like, it is possible to provide a method for producing a polyethylene resin in which formation of gels or fisheyes is greatly reduced without changing initiators or existing equipment.

DETAILED DESCRIPTION OF THE EMBODIMENTS

Hereinafter, preferred examples are provided for better understanding. However, these examples are for illustrative purposes only, and the present disclosure is not intended to be limited by these examples.

PRODUCTION EXAMPLE

Production of Low-Density Crosslinked Polyethylene Resin for Determination of Equation 1

For a year, low-density crosslinked polyethylene resins were produced under the following conditions and methods, and the data was collected.

First, such a production process was performed in a continuous reactor to which the first and second reactors were connected. First, a reaction initiator of oxygen and an organic peroxide (component name: tert-butylperoxy pivalate; TBPP) and an olefinic molecular weight regulator of propylene were supplied to the first reactor, and at the same time, the polymerization reaction proceeded while supplying ethylene gas. These polymerization reactions proceeded variously while adjusting the reaction conditions within the temperature range of 250 to 320° C. and the pressure range of 2200 to 2500 bar. In response to these polymerization temperature adjustments, the peak temperature T of the first reactor was adjusted within the range of 295 to 320° C. In addition, the reaction proceeded while adjusting the charging ratio Rm of the olefinic molecular weight regulator (where Rm represents "the charging weight ratio of the olefinic molecular weight regulator charged to the first reactor/ethylene charged to the first reactor") within the range of more than 0 and 0.02 or less.

A low-density polyethylene resin was obtained by these polymerization reactions, and then transferred to the second reactor to perform a crosslinking reaction. For the progress of the crosslinking reaction, a peroxide crosslinking agent of dicumyl peroxide was used, and the crosslinking reaction proceeded variously while adjusting within the temperature range of 140 to 190° C. Further, the reaction proceeded variously while adjusting the charging ratio Y1 (wt %) of the crosslinking agent (peroxide-based crosslinking agent charged to the second reactor/low-density polyethylene resin charged to the second reactor) within the range of 1.5 to 2.0% by weight.

After producing the low-density crosslinked polyethylene resin in each process under these conditions and methods, a ratio Y2 (wt %) at which the low-density polyethylene resin produced in the first reactor absorbs the crosslinking agent (peroxide crosslinking agent absorbed into low-density polyethylene resin in the second reactor/low-density polyethylene resin charged to the second reactor) was measured and confirmed.

This crosslinking agent absorption ratio Y2 (wt %) was measured using a moving die rheometer (MDR200E). More specifically, the change in torque due to the progress of the crosslinking in the measurement sample (final produced low-density crosslinked polyethylene resin) was measured using this MD, the difference with the torque change of a reference sample which already knew the absorption ratio of the crosslinking agent was compared, and the crosslinking agent absorption ratio of the measurement sample was converted/measured.

Based on the process condition data and the measurement data of Y2 obtained as described above, the relational expression of: the peak temperature T of the first reactor, the charging ratio Y1 (wt %) of the peroxide-based crosslinking agent to the second reactor, and the ratio Y2 (wt %) at which the low-density polyethylene resin absorbs the crosslinking agent, was determined by linear regression in the form of the following Equation 1, whereby the constants of A and B were determined.

[Equation 1]

$$(Y1-Y2)=A+BT$$

in Equation 1, Y1 (wt %) is the charging ratio (wt %) of (peroxide-based crosslinking agent charged to the second reactor/low-density polyethylene resin charged to the second reactor), Y2 (wt %) is the crosslinking agent absorption ratio (wt %) of (peroxide-based crosslinking agent absorbed into the low-density polyethylene resin in the second reactor/low-density polyethylene resin charged to the second reactor), T is the polymerization peak temperature (° C.) of the first reactor, and A and B are constants determined by linear regression analysis.

In the above linear regression analysis and the determination of Equation 1, it was divided into a first section where the Rm was less than 0.0148, a second section where the Rm was 0.0148 or more and less than 0.0150, and a third section where the Rm was 0.0150 or more, and the linear regression equation of Equation 1 was individually set for each section.

As a result of this analysis, the physical property prediction equations of Equation 1 summarized in Table 1 below were derived for the first to third sections.

TABLE 1

| First section<br>Rm < 0.0148 | Second section<br>0.0148 ≤ Rm < 0.0150 | Third section<br>Rm ≥ 0.0150 |
|---|---|---|
| (Y1 − Y2) = −1.691 +<br>0.0056 T | (Y1 − Y2) = −1.700 +<br>0.0056 T | (Y1 − Y2) = −1.712 +<br>0.0056 T |

EXAMPLES 1 TO 5

Reliability Evaluation of the Crosslinking Agent Absorption Ratio Prediction Result A low-density crosslinked polyethylene resin was produced under the same conditions and methods as in Preparation Example, but the charging ratio Rm of the molecular weight regulator, the temperature of the first reactor, the charging ratio Y1 of the crosslinking agent and the peak temperature T were set as shown in Table 2 below, and under these conditions, a low density crosslinked polyethylene resin was produced. For the low-density crosslinked polyethylene resin obtained in such a production process, the absorption ratio Y2 of a crosslinking agent was measured in the same manner as in Preparation Example, and shown in Table 2 below. Based on such actual production process and measurement data, the actual measurement data of Y1−Y2 was calculated and shown in Table 2 below.

For comparison with the actual measurement data, Y1 and T were substituted into the physical property prediction equation for each section set in Preparation Example, and the prediction values of Y1−Y2 were calculated and shown together in Table 2 below.

TABLE 2

| Process condition | Example | | | | |
|---|---|---|---|---|---|
|  | 1 | 2 | 3 | 4 | 5 |
| Rm | 0.0153 | 0.0151 | 0.0149 | 0.0146 | 0.0135 |
| First reactor peak temperature (T; ° C.) | 308.9 | 301.7 | 303.3 | 298.0 | 303.9 |
| Crosslinking agent charging ratio Y1 (wt %) | 1.78 | 1.74 | 1.78 | 1.73 | 1.75 |
| Crosslinking agent absorption ratio Y2 (wt %) | 1.75 | 1.75 | 1.77 | 1.74 | 1.73 |
| Y1 − Y2 deviation actual value (%) | 0.030 | −0.01 | 0.01 | −0.01 | 0.020 |
| Y1 − 2 deviation prediction value (%) | 0.027 | −0.014 | 0.008 | −0.014 | 0.020 |

As shown in Table 2, it was confirmed that the predicted value calculated from the physical property prediction equation derived in Production Example, and the actual value due to the progress of the actual process are substantially the same. From this, it was confirmed that the absorption ratio of the crosslinking agent could be reliably predicted by applying the physical property prediction method of the one embodiment.

The invention claimed is:

1. A method for predicting physical properties of a polyethylene resin comprising:

measuring a crosslinking agent absorption ratio Y2 (wt %) at which a low-density polyethylene resin absorbs a peroxide-based crosslinking agent based on a peak temperature T of a first reactor and a charging ratio Y1 (wt %) of the peroxide-based crosslinking agent in a second reactor;

determining constants of A and B by performing a linear regression according to the following Equation 1 based on the measured and collected data; and predicting a target crosslink agent absorption ratio Y2 (wt %) at which the low-density polyethylene resin absorbs the peroxide-based crosslinking agent in a production process of the low-density crosslinked polyethylene resin in accordance with the linear regression equation of Equation 1 in which the constants of A and B have been determined,

[Equation 1]

$$(Y1-Y2) = A + BT$$

in Equation 1, Y1 (wt %) is the charging ratio (wt %) of (peroxide-based crosslinking agent charged to the second reactor/low-density polyethylene resin charged to the second reactor), Y2 (wt %) is the crosslinking agent absorption ratio (wt %) of (peroxide-based crosslinking agent absorbed into the low-density polyethylene resin in the second reactor/low-density polyethylene resin charged to the second reactor), T is the polymerization peak temperature (° C.) of the first reactor, and A and B are constants determined by linear regression analysis, wherein the production process comprises polymerizing ethylene in the first reactor to form the low-density polyethylene resin, and crosslinking the low-density polyethylene resin in the second reactor in the presence of the peroxide-based crosslinking agent.

2. The method according to claim 1, wherein the polymerization is performed in the presence of an olefinic molecular weight regulator having 3 or more carbon atoms.

3. The method according to claim 2, wherein the olefinic molecular weight regulator includes propylene.

4. The method according to claim 2, wherein a charging ratio Rm of the olefinic molecular weight regulator supplied to the first reactor, (where Rm represents "the charging weight ratio of the olefinic molecular weight regulator charged to the first reactor/ethylene charged to the first reactor"), is divided into a plurality of sections, and the linear regression equation of Equation 1 is individually determined.

5. The method according to claim 4, wherein the charging ratio Rm is divided into a first section where the Rm is less than 0.0148, a second section where the Rm is 0.0148 or more and less than 0.0150, and a third section where the Rm is 0.0150 or more, and the linear regression equation of Equation 1 is determined by $(Y1-Y2)=A+0.0056T$ (with the proviso that values of A in each section differ from each other).

6. The method according to claim 1, wherein the peroxide-based crosslinking agent includes dicumyl peroxide.

7. The method according to claim 1, wherein the polymerization is performed under a temperature of 150 to 320° C. and a pressure of 2200 bar or more.

8. The method according to claim 1, wherein the peak temperature T of the first reactor is in a range of 290 to 320° C.

9. The method according to claim 1, wherein the crosslinking reaction is performed at a temperature of 110 to 210° C., and the charging ratio Y1 (wt %) is in a range of 1.5 to 2.0 wt %.

10. A method for producing a polyethylene resin comprising:

determining target physical properties of a final produced low-density crosslinked polyethylene resin;

determining a target absorption ratio of a crosslinking agent of the low-density crosslinked polyethylene resin to obtain the target physical properties; and determining the production process conditions of the low-density crosslinked polyethylene resin based on the method of claim 1 based on the target absorption ratio of the crosslinking agent, to produce a low-density crosslinked polyethylene resin.

11. The method according to claim 2, wherein production process conditions of the low-density crosslinked polyethylene resin are a polymerization peak temperature of the first reactor, a charging ratio of the olefinic molecular weight regulator and a charging ratio of the crosslinking agent.

12. The method according to claim 1, wherein the polymerization is performed in the presence of an olefinic molecular weight regulator having 3 to 5 carbon atoms.

13. The method according to claim 1, wherein the polymerization is performed under a temperature of 150 to 320° C. and a pressure of 2200 to 3000 bar.

14. A method of preparing electric wires comprising:

preparing the low-density crosslinked polyethylene resin based on the method of claim 10; and preparing the electric wires.

\* \* \* \* \*